May 11, 1965     R. B. REICHERT     3,183,037
SAFETY SUPPORTING DEVICE FOR DUMP TRUCK BODIES
Filed March 8, 1963
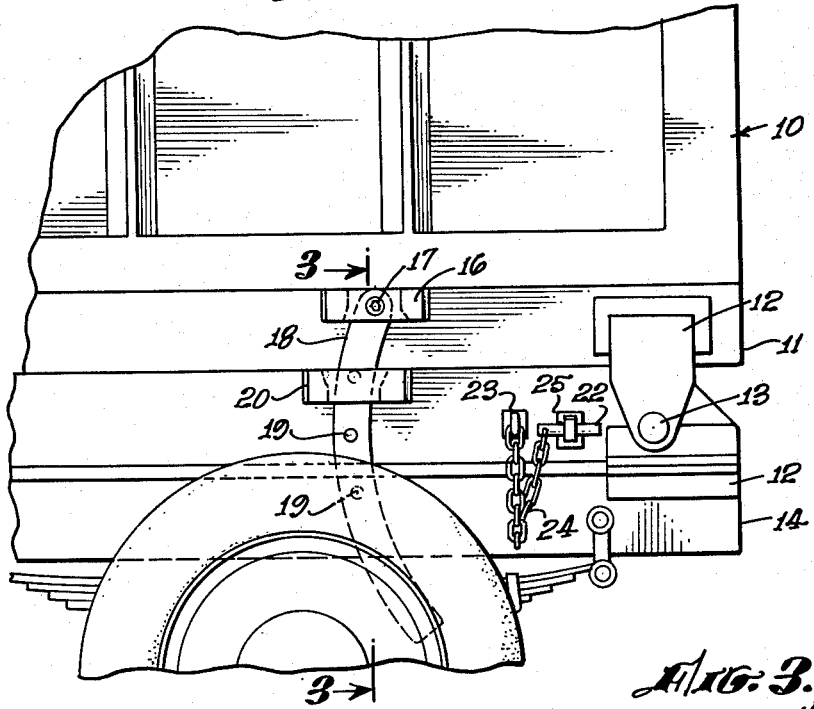
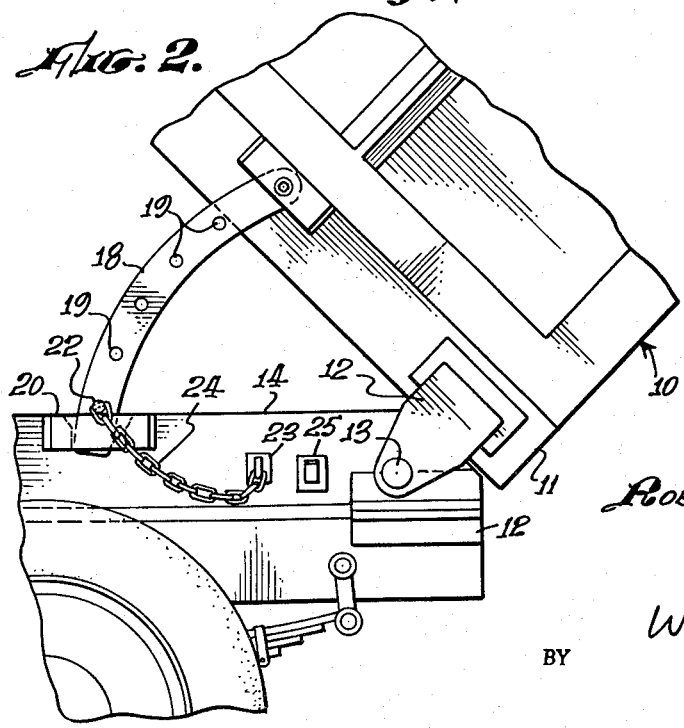
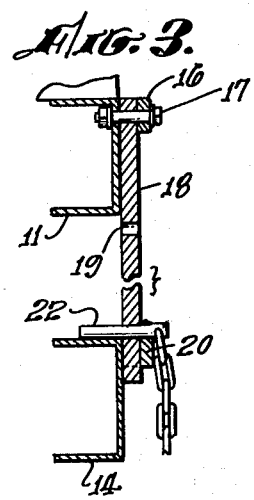
ROBERT B. REICHERT,
INVENTOR
BY
ATTORNEY 3,183,037
SAFETY SUPPORTING DEVICE FOR
DUMP TRUCK BODIES
Robert B. Reichert, 1808 S. Joyce St., Arlington, Va.
Filed Mar. 8, 1963, Ser. No. 264,001
2 Claims. (Cl. 298—38)
(Granted under Title 35, U.S. Code (1952), sec. 266)

The invention described herein may be manufactured and used by or for the Government of the United States of America for governmental purposes without the payment of any royalties thereon or therefor.

This invention relates to safety supporting devices for use on dump trucks having a dump body that may be elevated whereby the body may be safely held in an elevated dumping position.

The elevating mechanism for dump trucks generally includes a system of pivotally connected levers, interposed between the truck frame and the tiltable dump body, and driving means for operating the levers. Such driving means may be a power takeoff from the truck motor, separate hand or motor operated winches, or hydraulic jacks actuated by an hydraulic pump connected to the truck motor. Unless some means is employed to prevent it, the body may accidentally fall or descend by gravity at a time when it is imperative that the body be retained in an elevated position. Such times most frequently occur when a malfunction of the elevating mechanism occurs and the presence of the operator or other workman is required underneath the body.

Of the safety devices furnished in the past, many were fairly complex and required the presence of two people, one to elevate the body from the cab and the second to place or arm the safety device.

The principal object of my invention, therefore, is to provide a safety supporting device that may be easily and permanently installed on the truck and dump body and is readily available for providing support by one operator.

Another object of my invention is to provide a positively operating safety device that is relatively inexpensive to manufacture and any one model can be applied to many different makes of such dump trucks.

Other objects, advantages and novel features of the invention will become apparent from the following detailed description of the invention when considered in conjunction with the accompanying drawings wherein:

FIGURE 1 is a partial side elevation of a dump truck illustrating the invention with the dump body resting on the truck body;

FIGURE 2 is a partial side elevation of the dump truck illustrating the invention in use with the dump body elevated; and FIGURE 3 is a partial cross-sectional view taken on the line 3—3 of FIGURE 1.

With reference to FIG. 1, dump body 10 is built up on its channel frame 11 and is pivotally supported by the brackets 12 and pivot bolt 13 attached to the truck channel frame 14. It is understood, of course, that brackets 12 and pivot bolt 13 appear on both rear corners of the dump body and truck frame, the right rear brackets not being shown.

Upper supporting arm bracket 16 is secured to the dump body channel frame 11 by welding or other suitable means. Safety supporting arm 18 is pivotally supported therein by pivot bolt 17. Lower supporting arm bracket receptacle 20 is secured to truck frame 14 in such off-set relation to truck frame 16 as will allow the supporting arm 18 to pass fully therethrough as the dump body is elevated. Both of these brackets 16 and 20 are similar in shape and dimensions and are simple flat U shapes with the open portion facing the channel frame.

Safety supporting arm 18 is curved to correspond with the radius of the upper bracket 16 from the dump body pivot point 13. This supporting arm is provided with a plurality of apertures 19 for the reception of a supporting pin 22. This supporting pin 22 is secured to the truck frame 14 by means of a small bracket 23 and chain 24. When not in use, the supporting pin may be supported in another small bracket pin holder 25.

In operation, the disposition of the dump body with relation to the truck body, as shown in FIG. 1, is for normal transportation. The supporting arm 18 is in its extreme downward position and the supporting pin 22 is stored in its holder 25. When, as in FIG. 2, the dump body is raised or elevated by its elevating mechanism, the supporting arm 18 is drawn upwardly through the lower bracket 20. The operator then gets out of the cab and proceeds to each side of the truck in turn and inserts the pins 22 in the apertures 19 which are visible just above the upper surface of lower bracket 20. After placing the pins in the proper apertures in the safety supporting arm, the operator may then operate the elevating mechanism in reverse so that the pin rests securely on the upper surface of the bracket 20. The dump body is now positively held by its own weight against the lower brackets 20 and the elevating mechanism can be safely disconnected for cleaning and repair.

Having thus described a preferred embodiment of my invention, I claim:

1. A safety supporting device for dump trucks having a tiltable dump body pivoted at the rear end of the truck comprising:
   an arcuate supporting arm pivotally mounted on each side of said dump body, said arcuate arm being provided with a plurality of apertures;
   a supporting arm bracket receptacle fixedly mounted on each side of said truck and adapted to receive said supporting arm for passage therethrough; and
   a supporting pin chain-mounted on each side of said truck adjacent to each of said supporting arm bracket receptacles, said supporting pin adapted to be inserted into one of said supporting arm apertures visible above said bracket receptacle whereby said supporting arm is prevented from further downward movement through said receptacle.

2. A safety supporting device for a dump truck which has side body frame members and a tiltable dump body provided at the rear end of the truck comprising:
   an arcuate supporting arm pivotally mounted on each side of said dump body, said arcuate arm being provided with a plurality of apertures located centrally along the longitudinal axis of the arm;
   a U shaped supporting arm bracket mounted on a side of each frame member with the open portion of the U shape of each bracket facing the respective frame member so as to provide in combination therewith a receptacle for slidably receiving a respective supporting arm;
   an upper surface of each bracket and an upper surface of the respective frame member lying substantially within a common plane;
   a supporting pin chain-mounted on each said of said truck adjacent to each of said supporting arm bracket receptacles, said supporting pin adapted to be inserted into one of said supporting arm apertures, whereby said pin will bear downwardly upon the upper surfaces of each bracket and frame member combination to retain the supporting arm and hold the dump body in a selected elevated position.

References Cited by the Examiner

UNITED STATES PATENTS

| | | | |
|---|---|---|---|
| 477,702 | 6/92 | Rodenhausen | 298—11 |
| 513,132 | 1/94 | McClanathan | 298—38 |

FOREIGN PATENTS

| | | |
|---|---|---|
| 13,673 | 1896 | Great Britain. |
| 53,928 | 12/10 | Switzerland. |
| 1,063,833 | 12/53 | France. |

ARTHUR L. LA POINT, *Primary Examiner.*

RALPH D. BLAKESLEE, MILTON BUCHLER,
*Examiners.*